(12) United States Patent
Utsumi

(10) Patent No.: US 6,835,053 B2
(45) Date of Patent: Dec. 28, 2004

(54) CHECK VALVE

(75) Inventor: Yasutaka Utsumi, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/132,450

(22) Filed: Apr. 26, 2002

(65) Prior Publication Data
US 2002/0159903 A1 Oct. 31, 2002

(30) Foreign Application Priority Data
Apr. 26, 2001 (JP) ........................................ 2001-130402

(51) Int. Cl.$^7$ ........................... F04B 39/10; F16R 21/04
(52) U.S. Cl. .................. 417/569; 137/541; 137/533.21
(58) Field of Search ................................. 417/569, 462; 137/513.3, 513.5, 512.3, 533.29, 461, 533.21, 542, 541; 251/172, 178, 334, 353

(56) References Cited

U.S. PATENT DOCUMENTS

| | | | | |
|---|---|---|---|---|
| 3,092,139 A | * | 6/1963 | Rodgers et al. | ........ 137/533.29 |
| 4,757,974 A | * | 7/1988 | Ward et al. | .................. 251/356 |
| 5,181,690 A | * | 1/1993 | Gonsior | ....................... 251/172 |
| 5,533,548 A | * | 7/1996 | Grant | .......................... 137/540 |
| 5,785,082 A | * | 7/1998 | Geis et al. | ............. 137/516.29 |
| 6,364,641 B2 | * | 4/2002 | Mori | ........................... 417/569 |

* cited by examiner

*Primary Examiner*—Charles G. Freay
(74) *Attorney, Agent, or Firm*—Nixon & Vanderhye PC

(57) ABSTRACT

In the check valve having a valve seat member and the valve member, the valve seat member is provided with first and second conical seats. The second conical seat is positioned upstream the first conical seat. An angle of the second conical seat to an axis of the valve member is more acute than that of the first conical seat. Since the check valve has the second conical seat, contact pressure applied to the first conical seat is uniformly dispersed and, thus, the first conical seat is less worn out. Further, the second conical seat prevents the valve member from cutting into and sticking to the valve seat member, even if the wear has been progressed. Accordingly, an operation of the check valve is stable for a longer period of time.

10 Claims, 10 Drawing Sheets

CHECK VALVE

CROSS REFERENCE TO RELATED APPLICATION

This application is based upon and claims the benefit of priority of Japanese Patent Applications No. 2001-130402 filed on Apr. 26, 2001, the content of which is incorporated herein by reference.

BACKGROUND OF THE INVENTION

1. Field of the Invention

The present invention relates to a check valve and a fuel injection pump incorporating the same for an internal combustion engine.

2. Description of Related Art

Conventionally, there has been proposed a check valve that permits fluid to flow only in one direction in a fluid passage. The check valve is used, for example, in a fuel injection pump for an internal combustion engine (hereinafter called merely an engine). As one of the fuel injection pumps for the engine, is known a star-shaped pump in which a plurality of plungers arranged radially around a cam pressurize fuel sucked into fuel pressure chambers each provided f or each of the plungers. The fuel pressurized in the respective fuel pressure chambers are gathered into a pressure fuel delivery passage provided in a pump housing and, then, supplied therefrom to a common rail.

A low pressure fuel passage, through which fuel is sucked into the fuel pressure chamber, is provided with a low pressure check valve and a high pressure fuel passage, through which fuel pressurized by the plunger is delivered, is provided with a high pressure check valve. In particular, in the fuel injection pump in which amount of fuel to be sucked is regulated, higher accuracy of valve opening pressure of the low pressure check valve is required so that the valve opening pressure is less fluctuated in addition to ensuring fluid tight sealing. A valve member of the low pressure check valve is formed generally in conical shape.

Further, it is a recent tendency that higher load is applied to the valve member, since higher fuel injection pressure is required to reduce emission. To this end, face pressure of seat contact between a seat of a valve seat member and a valve of the valve member tends to be greater so that the seat of the valve seat member is more rapidly worn. As the wear is progressed, a step is formed in the seat. At this time, the valve is prone to cut or cling into the step due to pressure applied to the fuel pressure chamber. Accordingly, the valve member sticks to the step so that the fuel cannot be sucked.

SUMMARY OF THE INVENTION

An object of the invention is to provide a check valve in which the valve member are the valve seat member are less worn.

Another object of the invention is to provide a check valve in which a valve stick hardly occurs so that it operation is stable.

It is a further object to provide a fuel injection pump whose operation is reliable with a longer lifetime.

To achieve any of the above objects, the check valve has a valve seat member, which has an inner wall that forms the fluid passage, and the valve member. The inner wall is provided with first and second conical seats immediately adjacent each other. The second conical seat is positioned upstream the first conical seat. The valve member is provided at an outer circumference thereof with a conical face that comes in contact with the first conical seat for closing the fluid passage and away therefrom for opening the fluid passage.

In the check valve mentioned above, an angle of the second conical seat to an axis of the valve member is more acute than that of the first conical seat.

Since the check valve has the second conical seat, a relief angle of the valve seat member to the valve member is relatively small so that contact pressure applied to the first conical seat is uniformly dispersed and, thus, the first conical seat is less worn out.

Further, the second conical seat prevents the valve member from cutting into and sticking to the valve seat member, even if the wear has been progressed. Accordingly, an operation of the check valve is stable for a longer period of time.

It is preferable that, when the valve member is initially assembled to the valve seat member, one of axial end circumferential peripheries of the side surface comes in contact with the first conical seat, or a circumferential edge of the first conical seat on a side of the second conical seat comes in contact with the side surface. This will serve to keep a valve opening pressure of the check valve constant. Accordingly, if the check valve is applied to the fuel injection pump, this helps improve endurance and reliability of the fuel injection pump.

Further, it is preferable that the valve member has a relief conical face positioned immediately adjacent to and downstream the conical face and an angle of the relief face to an axis of the valve member is more acute than that of the control face.

Since another relief angle of the valve seat member to the valve member is also relatively small because of the relief conical face so that contact pressure applied to the first conical seat is further uniformly dispersed and, thus, the first conical seat is much less worn out.

Further, since the relief conical seat prevents the valve member from cutting into and sticking to the valve seat member, even if the wear has been progressed, an operation of the check valve is more stable for a longer period of time.

As an alternative, in the check valve having the valve seat member, whose inner wall forms a fluid passage, and the valve member, the inner wall is provided with a conical seat and a valve member is provided at an outer circumference thereof with immediately adjacent first and second conical faces. The second conical face is positioned downstream the first conical face and the first conical face comes in contact with the conical seat for closing the fluid passage and away therefrom for opening the fluid passage.

With the check valve mentioned above, an angle of the second conical face to an axis of the valve member is more acute than that of the first conical face.

Since the check valve has the second conical face, a relief angle of the valve seat member (the conical seat) to the valve member (the second conical face) is relatively small so that contact pressure applied to the conical seat is uniformly dispersed and, thus, the conical seat is less worn out.

Further, the second conical face prevents the valve member from cutting into and sticking to the valve seat member, even if the wear has been progressed. Accordingly, an operation of the check valve is stable for a longer period of time.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

A check valve 23 according to a first embodiment is described with reference to FIGS. 1A to 5B.

Figure 2:
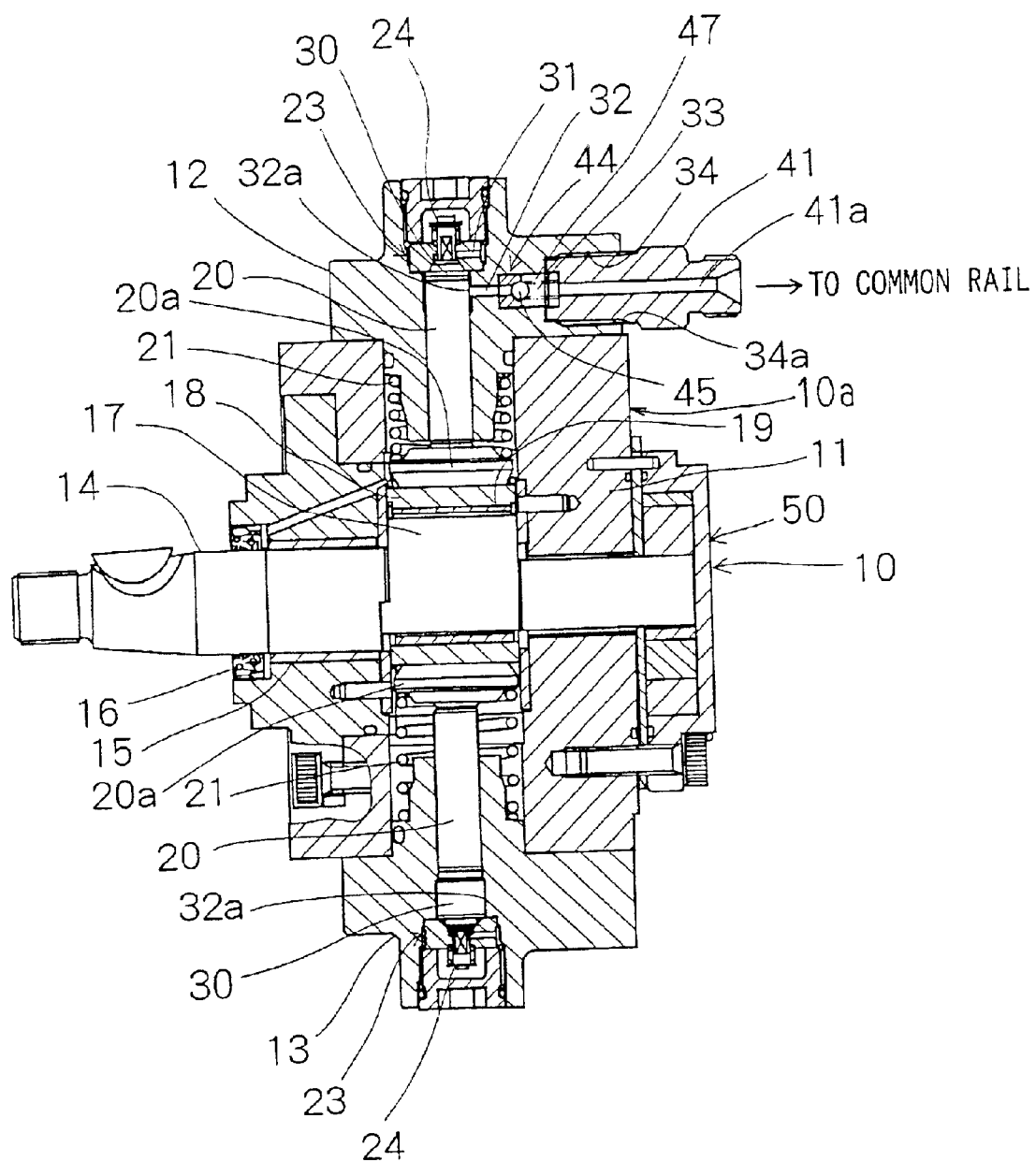
FIG. 2 is a cross sectional view of a fuel injection pump incorporating the check valve according to the first embodiment.

FIG. 2 shows a fuel injection pump 10 for a diesel engine incorporating the check valve 23 according to first embodiment of the present invention. A pump housing 10a of the pump 10 is composed of a housing body 11 and cylinder heads 12 and 13. The housing body 11 is made of aluminum and the cylinder head 12 and 13 are made of iron. Each of plungers 20, which is a moving member, reciprocatingly moves inside each of the cylinder heads 12 and 13. Each of fuel pressure chambers 30 is constituted by each inner circumference of the cylinder heads 12 and 13, each end of check valves 23 and each axial end of the plungers 20. According to the first embodiment, shapes of the cylinder heads 12 and 13 are nearly same to each other except positions where screw holes for installation, fuel passages and the like are located. The positions where the screw holes, fuel passages and the like are located may be identical so that the shapes of the cylindrical heads 12 and 13 are substantially same.

A drive shaft 14 is rotatably held via a journal 15 by the housing body 11. An oil seal 16 seals a clearance between the housing body 11 and the drive shaft 14. A cam 17, whose cross section is formed in circular shape and whose axis is eccentric to an axis of the drive shaft 14, is formed integrally together with the drive shaft 14. Plungers 20 are positioned on opposite sides of the drive shaft 14 at 180° intervals. A bush 19 is slidably interposed between a shoe 18 and the cam 17. Another axial end of each of the plungers 20 and an outer surface of the shoe 18, which face each other, are flat and are in contact with each other.

The plunger 20 is moved reciprocatingly via the shoe 18 by the cam 14 to pressurize fuel sucked from a fuel inlet passage 31 via the check valve 23 to the fuel pressure chamber 30. The check valve 23, which is a low pressure check valve, serves to prevent fuel from flowing in reverse from the fuel pressure chamber 30 to the fuel inlet passage 31.

Each of springs 21 biases each of the plungers 20 toward the shoe 18. Since respective contact surfaces of the shoe 18 and the plunger 20 are formed in flat shape, pressure per unit surface of the shoe 18 in contact with the plunger 20 is relatively low. According to the rotation of the cam 17, the shoe 18 slidably revolves around the cam 17 without self-rotating.

A fuel outlet passage 32 is formed straight in the cylinder head 12 and has an opening 32a communicating with the fuel pressure chamber 30. An elongated fuel chamber 33, whose flow area is larger than that of the fuel outlet passage 32, is positioned downstream the fuel outlet passage 32. A check valve 44 is accommodated in the fuel chamber 33. The cylinder head 12 is further provided downstream the fuel chamber 33 with an accommodation hole 34 whose flow area is larger than that of the fuel chamber 33. The accommodation hole 34 is opened to an outer wall of the cylinder head 12 for forming a fuel outlet 34a. The fuel outlet passage 32, the fuel chamber 33 and the accommodation hole 34 constitute a pressurized fuel delivery passage. A connecting member 41 for connecting a fuel delivery pipe is housed in the accommodation hole 34 by screwing or the like. The connecting member 41 is provided inside with a fuel passage 41a communicating with the fuel chamber 33. The fuel passage 41a and the fuel outlet passage 32 are located substantially on the same straight line.

The check valve 44 has a ball shaped valve 45 and a spring 47 biasing the ball shaped valve 45 in a direction of closing the valve 44. The check valve 44, which is a high pressure check valve, serves to prevent fuel from flowing in reverse from the fuel chamber 33, which is located downstream the check valve 44, to the fuel pressure chamber 30 via the fuel outlet passage 32. The connecting member 41 is connected to a common rail (not shown) serving as a pressure accumulation member through the fuel delivery pipe and the fuel pressurized by the fuel injection pump 10 is supplied to the common rail through the connecting member 41. The cylinder head 13 is also provided with a fuel outlet passage (not shown) and down stream the fuel outlet passage with a high pressure check valve (not shown), which are similar to those of the cylinder head 12. The fuel outlet passage is connected via the high pressure check valve to the fuel chamber 33 and via a fuel delivery pipe to the common rail.

An inner gear type feed pump 50 serves to suck fuel from a fuel tank (not shown) via a fuel inlet (not shown), pressurize and deliver it to a fuel passage (not shown). When fuel pressure of the feed pump 50 exceed a predetermined value, a regulate valve (not shown) is opened so that the excess fuel is returned to the fuel tank.

The housing body 11 is provided with a fuel regulation solenoid (not shown) that regulates an amount of fuel to be sucked from the fuel inlet passage 31 via the check valve 23 to the fuel pressure chamber 30 according to engine operating conditions.

An operation of the fuel injection pump 10 is described hereinafter.

According to the revolution of the shoe 18 around the cam 17, which rotates together with the drive shaft 14, the plungers 20 move reciprocatingly, while the flat contact surfaces of the shoe 18 and the plungers 20 slide each other.

When the plunger 20 moves downward from a top dead point, fuel from the feed pump 50, whose amount is regulated by the fuel regulation solenoid, is flowed in the fuel pressure chamber 30 via the fuel inlet passage 31 and the check valve 23. When the plunger 20 moves upward toward the top dead point after reaching a bottom dead point, the check valve 23 is closed and pressure of fuel in the fuel pressure chamber 30 starts increasing. When pressure of fuel in the fuel pressure chamber 30 increases beyond that of fuel in the fuel passage 41a, the check valve 44 is opened.

Fuel pressurized in the fuel pressure chamber 30 on a side of the cylinder head 12 is delivered to the fuel passage 41a through the fuel outlet passage 32, the check valve 44 and the fuel chamber 33. Fuel pressurized in the fuel pressure chamber 30 on a side of the cylinder head 13 is delivered through the fuel passage (not shown) to the fuel chamber 33. Fuel from the respective fuel pressure chambers 30 of the cylinder heads 12 and 13 are merged in the fuel chamber 33 and delivered to the common rail through the fuel passage 41a. The fuel supplied from the fuel injection pump 10, whose pressure is fluctuated, is accumulated in the common rail to keep the fuel pressure constant. High pressure fuel is supplied to injectors (not shown) from the common rail.

Figure 3:
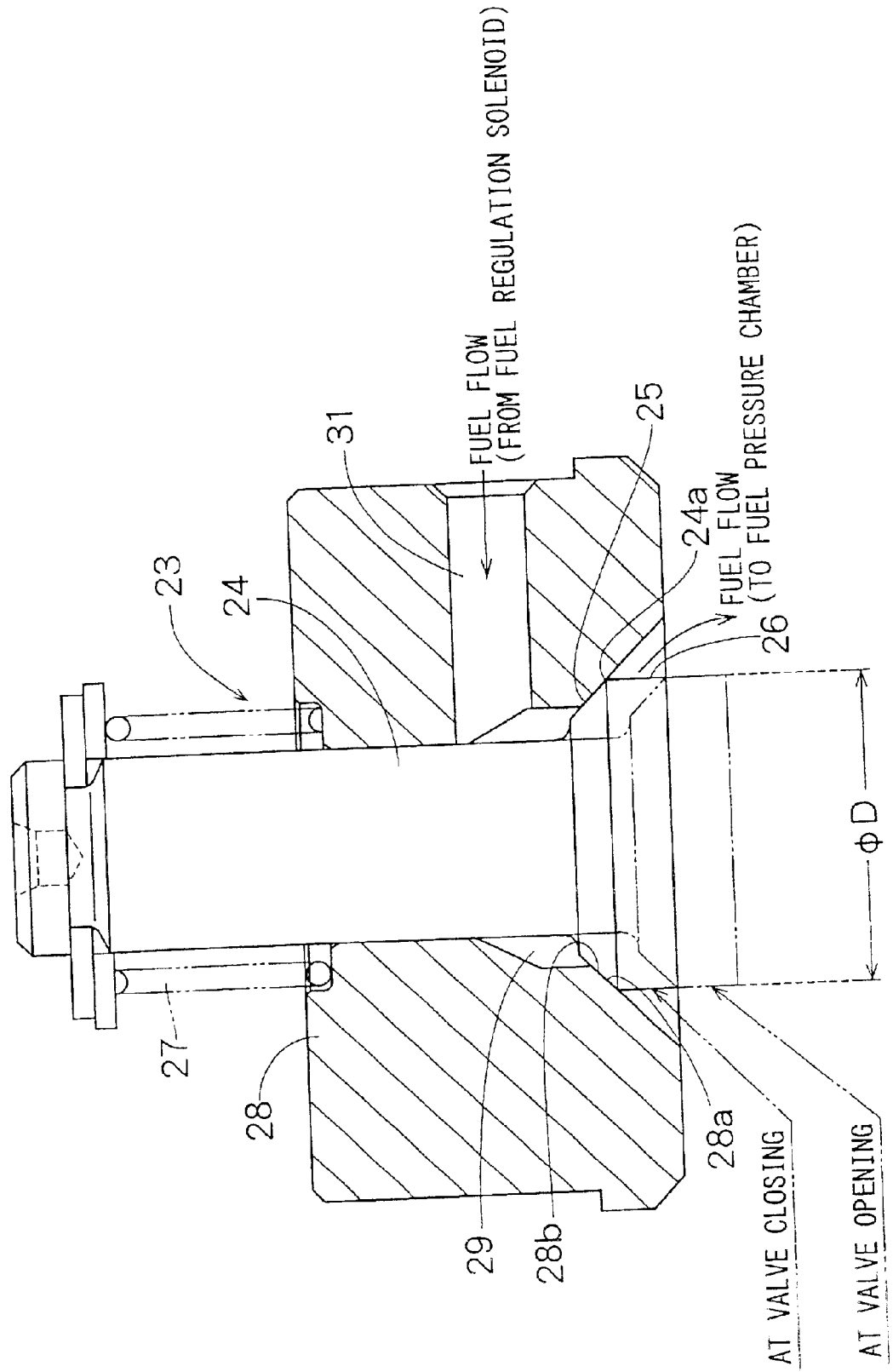
FIG. 3 is a cross-sectional view of the check valve according to the first embodiment.

As shown in FIG. 3, the check valve 23 is provided with a valve member 24, a valve seat member 28 on which the valve member 24 is seated and a spring 27 biasing the valve member 24 toward the valve seat member 28. The valve member 24 has a truncated cone portion 25 whose side surface constitutes a conical face and a large diameter portion 26 whose outer surface is cylindrical and which is immediately adjacent the truncated cone portion 25. A boundary between the truncated cone portion 25 and the large diameter portion 26 is formed in circular shape and Constitutes a circumferential edge 24a of the truncated cone portion 25. The circumferential edge 24a comes in contact with a first conical seat 28a of the valve seat member 28 at a valve closing time, in particular, when the valve member 24 is initially assembled to the valve seat member 28. When the circumferential edge 24 a is seated on the seat 28a, fuel from the fuel regulation solenoid is shut off. Valve opening pressure is defined by preset load of the spring 27 and seat diameter $\phi D$, as shown in FIG. 3.

The valve seat member 28 is provided inside with a valve chamber 32 communicating with the fuel inlet passage 31. When pressure of fuel in the valve chamber 29 exceeds the valve opening pressure mentioned above, the check valve 23 is opened so that fuel is delivered to the fuel pressure chamber 30. When the plunger 20 starts pressurizing fuel delivered to the fuel pressure chamber 30, the check valve 23 is closed so that the valve member 24 shuts off fuel.

Figure 1A:
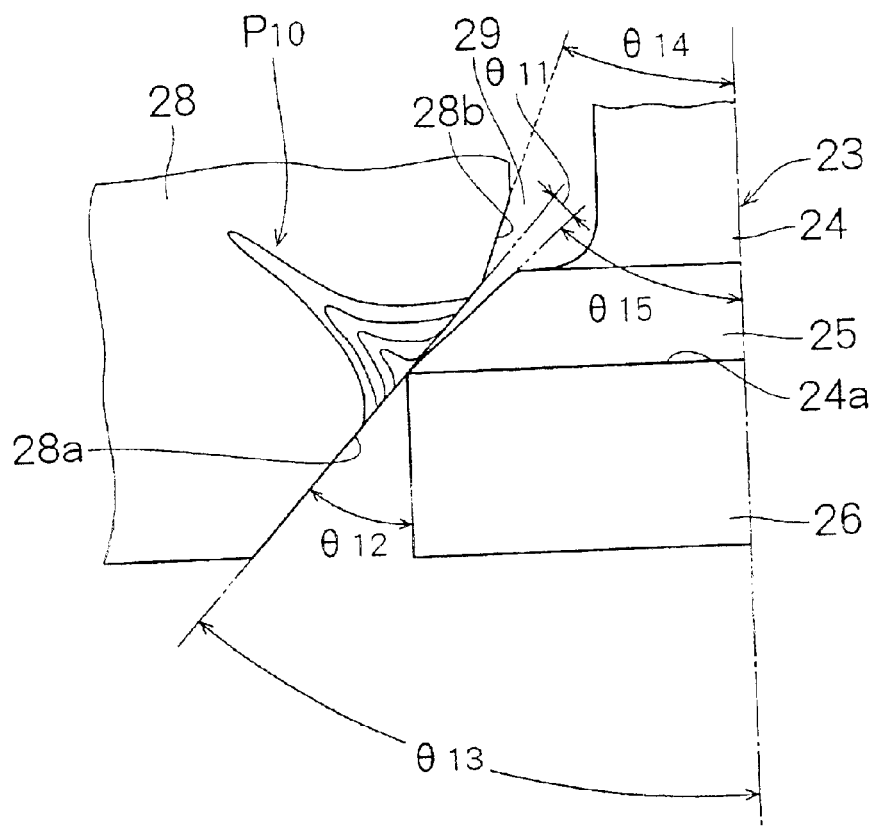
FIG. 1A is a partly enlarged schematic view of a valve seat member and a valve member of a check valve at an initial assembly stage according to a first embodiment of the present invention.
Figure 5A:
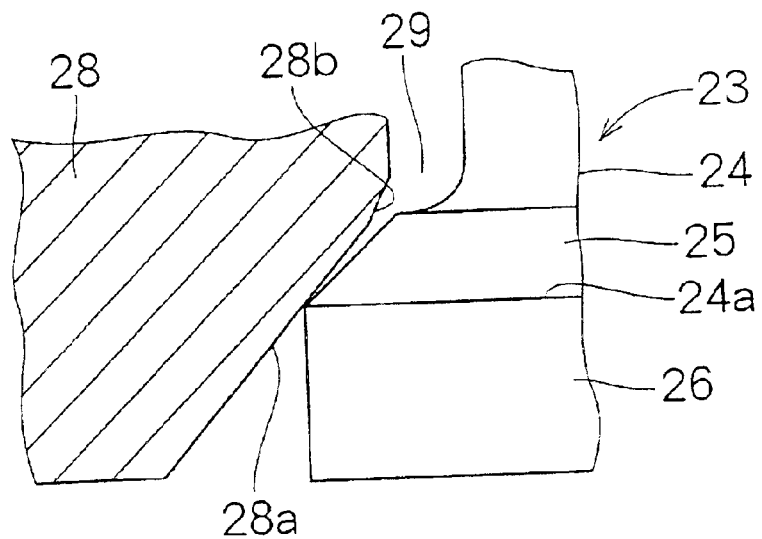
FIG. 5A is a cross sectional view of the valve member in contact with the valve seat member at the initial assembly stage according to the first embodiment.

As shown in FIGS. 1A and 5A, the valve seat member 28 has an inner wall that forms a fuel passage. The inner wall of the valve seat member 28 is provided with first and second conical seats 28a and 28b. The first conical seat 28a is constituted by a side surface of truncated cone. An axial end of the first conical seat 28a on a large diameter side thereof is connected with the fuel pressure chamber 30 (refer to FIG. 2) and another axial end thereof is immediately adjacent the second conical seat 28b on a large diameter side thereof. The circumferential edge 24a of the valve member 24 comes in contact with the first conical seat 28a. The second conical seat 28b is constituted by a side surface of a truncated cone whose seat angle $\theta_{14}$ to an axis of the valve member 24 is more acute than a seat angle $\theta_{13}$ of the first conical seat 28a thereto. An axial end of the second conical seat 28b on a small diameter side thereof is connected with the valve chamber 29.

At the valve closing time and at an initial assembly stage of the check valve 23 when the valve seat member 28 and the valve member 24 are not worn, the valve member 24 comes in contact with the valve seat member 28 so as to form a first relief angle $\theta_{11}$ of the truncated cone portion 25 to the first conical seat 28a and a second relief angle $\theta_{12}$ of the large diameter portion 26 to the first conical seat 28a. At this time, pressure of contact surface between the circumferential edge 24a and the first conical seat 28a shows a pattern having a peak $P_{10}$, as shown in FIG. 1A. A seat angle $\theta_5$ of the truncated cone portion 25 to the axis of the valve member 24 is larger than the seat angle $\theta_{13}$ of the first conical seat 28a thereto ($\theta_{15} > \theta_{13}$). As the first relief angle $\theta_{11}$ is smaller, the contact surface between the valve member 24 and the valve seat member 28 is larger due to resilient deformation of the first conical seat 28a. Accordingly, it is preferable that the first relief angle $\theta_{11}$ is as small as possible.

Figure 1B:
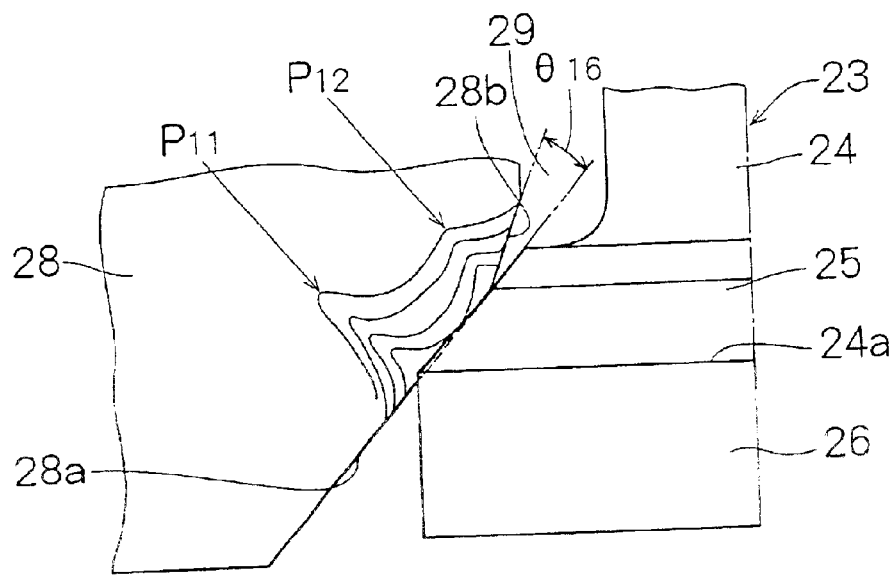
FIG. 1B is a partly enlarged schematic view of the valve seat member and the valve member of the check valve at a first wear stage according to the first embodiment.

As shown in FIG. 1B, at the valve closing time and at a first wear stage of the check valve 23, the valve seat member 28 and the valve member 24 are worn out to a certain extent that a larger area of the truncated corn portion 25 comes in contact with the first conical seat 28a and the first relief angle $\theta_{11}$ becomes almost zero or disappears. At this time, a third relief angle $\theta_{16}$ of the truncated cone portion 25 to the second conical seat 28b becomes out and pressure of contact surface between the truncated corn portion 25 and the first conical seat 28a shows a pattern having first and second peaks $P_{11}$ and $P_{12}$, as shown in FIG. 1B.

A conventional check valve is described with reference to FIGS. 9A to 10B for a purpose of comparing with the check valve 23 of the first embodiment. The conventional check valve is provided with a valve seat member 128 having a single conical seat 128a but not having the second conical seat 28b of the first embodiment.

Figure 9A:
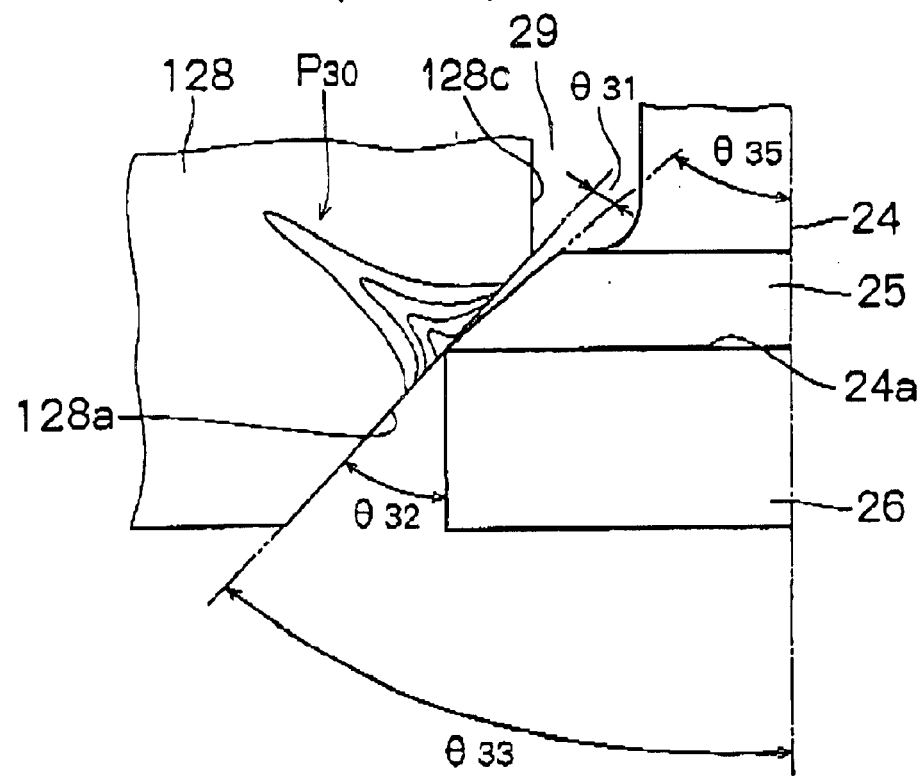
FIG. 9A is a partly enlarged schematic view of a valve seat member and a valve member of a check valve at an initial assembly stage according to the comparison embodiment.
Figure 10A:
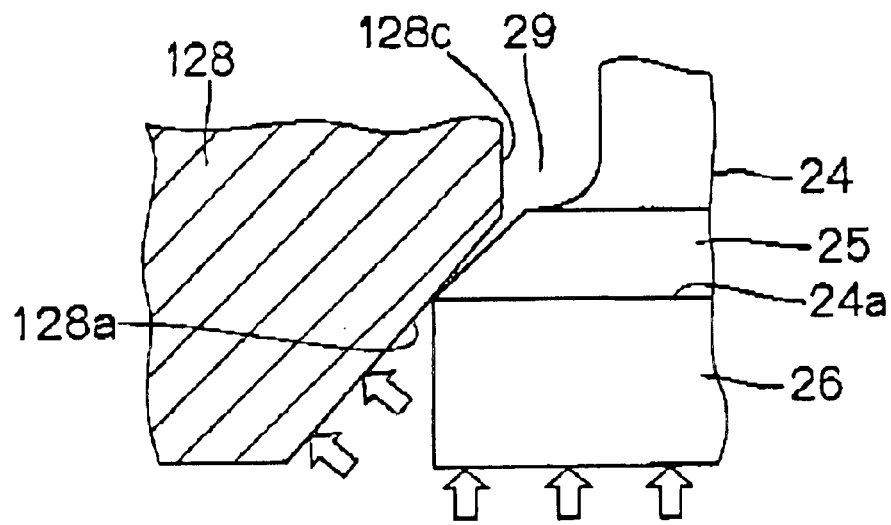
FIG. 10A is a cross sectional view of the valve member in contact with the valve seat member at the initial assembly stage according to the comparison embodiment.

As shown in FIGS. 9A and 10A, the valve seat member 128 has an inner wall that forms a fuel passage. The inner wall of the valve seat member 128 is provided with the conical seat 128a and a cylindrical portion 128c upstream and immediately adjacent the conical seat 128a. The circumferential edge 24a comes in contact with the conical seat 128a. At the valve closing time and at the initial assembly stage of the conventional check valve, the valve member 24 comes in contact with the valve seat member 128 so as to form a first relief angle $\theta_{31}$ of the truncated cone portion 25 to the conical seat 128a and a second relief angle $\theta_{32}$ of the large diameter portion 26 to the conical seat 128a. At this time, pressure of contact surface between the circumferential edge 24a and the conical seat 128a shows a pattern having a peak $P_{30}$ as shown in FIG. 9A. A seat angle $\theta_{35}$ of the truncated cone portion 25 to the axis of the valve member 24 is larger than the seat angle $\theta_{33}$ of the conical seat 128a thereto ($\theta_{35} > \theta_{33}$). The peak $P_{30}$ is substantially same to the peak $P_{10}$ of the first embodiment.

Figure 9B:
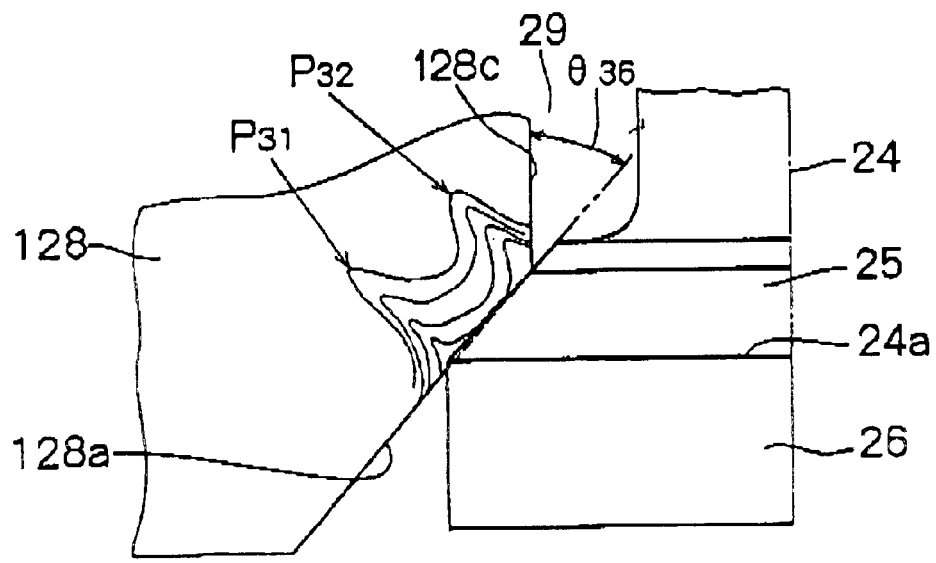
FIG. 9B is a partly enlarged schematic view of the valve seat member and the valve member of the check valve at a first wear stage according to the comparison embodiment.

As shown in FIG. 9B, at the valve closing time and at the first wear stage of the check valve, the valve seat member 128 and the valve member 24 are worn out to a certain extent that a larger area of the truncated corn portion 25 comes in contact with the conical seat 128a and the first relief angle $\theta_{31}$ becomes almost zero or disappears. At this time, a third relief angle $\theta_{36}$ of the truncated cone portion 25 to the cylindrical portion 128c is formed and pressure of contact surface between the truncated corn portion 25 and the conical seat 128a shows a pattern having first and second peaks $P_{31}$ and $P_{32}$, as shown in FIG. 9B.

Since higher fuel injection pressure is demanded recently to reduce emission, a load applied to the valve member 24 is higher at the valve closing time so that pressure of the contact surface between the conical seat 128a and the truncated cone portion 25 is higher. Accordingly, wear of the valve seat member 128 and the valve member 24, in particular, a wear of the conical seat 128a, tends to be rapidly progressed.

Figure 10B:
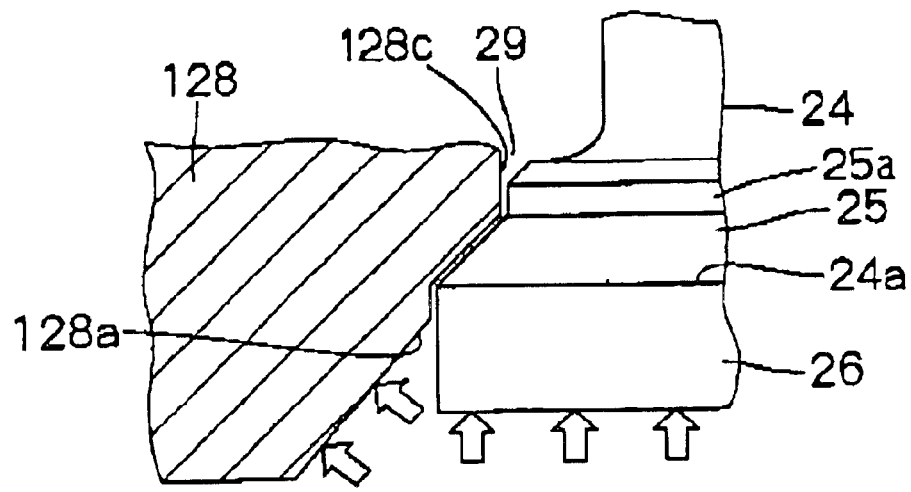
FIG. 10B is a cross sectional view of the valve member in contact with the valve seat member at a second wear stage according to the comparison embodiment.

As shown in FIG. 10B, as the wear is further progressed (at second wear stage), a step 25a extending axially is formed on the truncated cone portion 25 since the cylindrical portion 128c has a surface axially extending. When the conical seat 128a is pressed and expanded radially outward by the pressure of the fuel pressure chamber 30, the cylindrical portion 128c is closely engaged with the step 25a and an edge of the step 25a cuts into the valve seat member 128 so that the valve seat member 128 is prone to stick to the valve member 24, which results in failing to suck the fuel.

Figure 4:
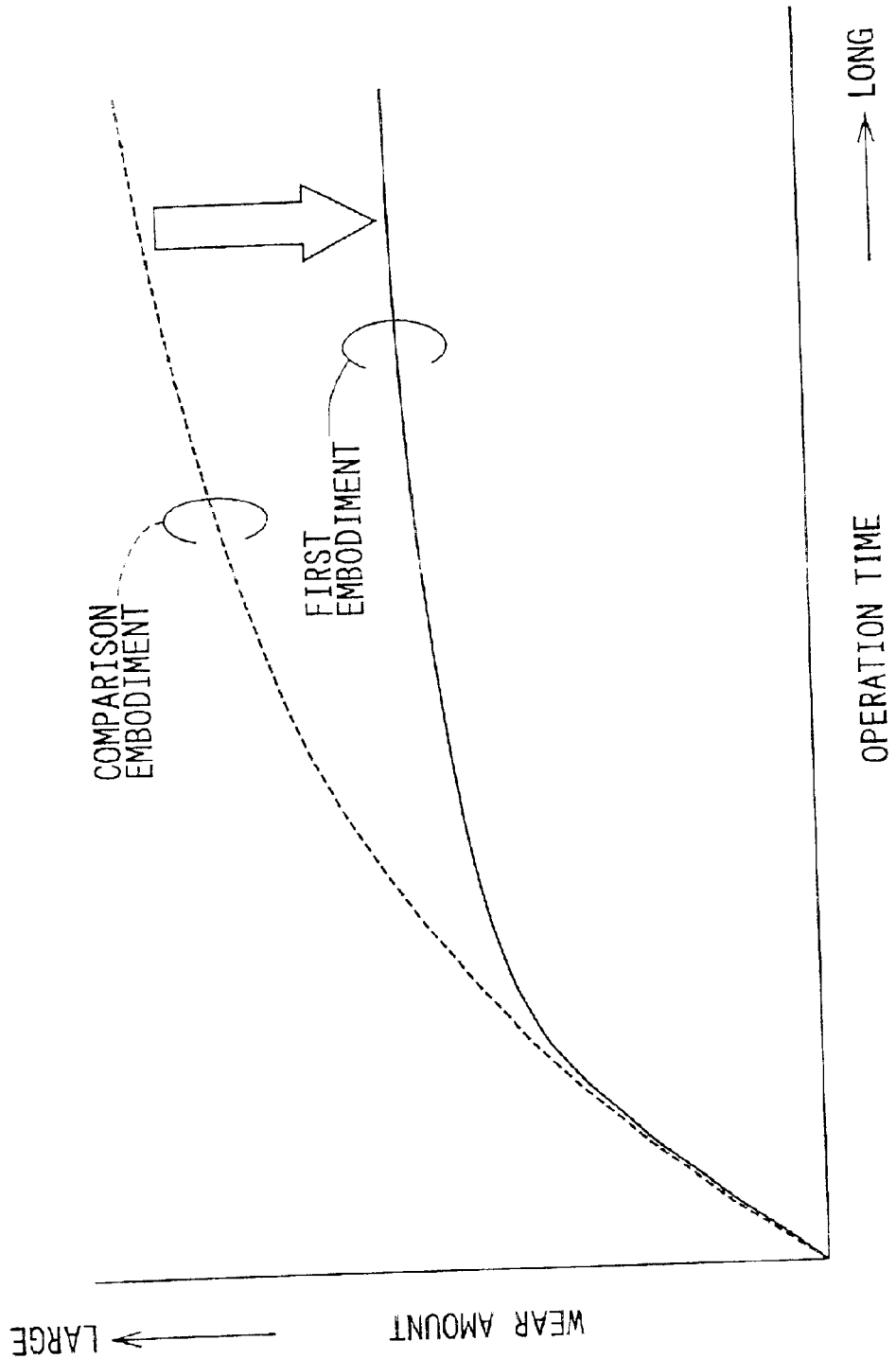
FIG. 4 is a chart showing a valve seat wear amount of the check valve according to the first embodiment in comparison with the comparison embodiment.

According to the first embodiment, however, the third relief angle $\theta_{16}$ is smaller than the third relief angle $\theta_{36}$ of the comparison embodiment ($\theta_{16} < \theta_{36}$). Accordingly, the second peak $P_{12}$ of the first embodiment is smaller than the second peak $P_{32}$ of the comparison embodiment so that pressure applied to the contact surface of the valve seat member 28 is more uniformly dispersed at the first wear sage. As a result, wear amount of the first conical surface 28a of the first embodiment is smaller, compared with that of the comparison embodiment, as shown in FIG. 4.

Figure 5B:
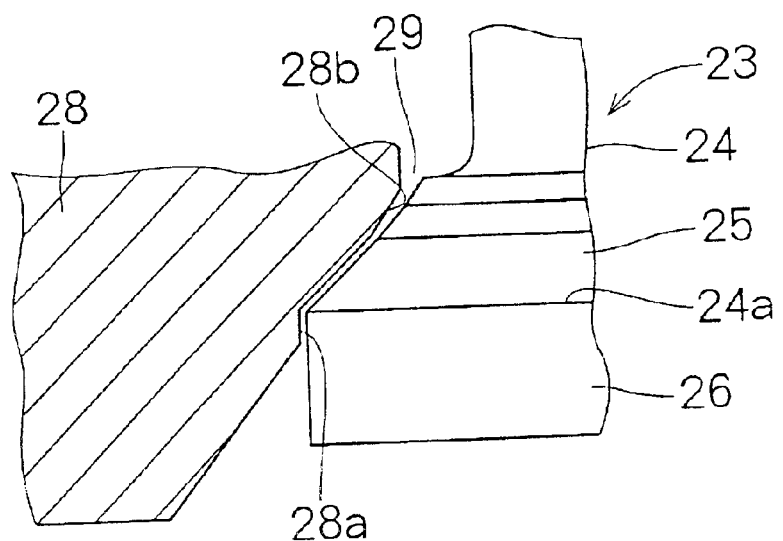
FIG. 5B is a cross sectional view of the valve member in contact with the valve seat member at a second wear stage according to the first embodiment.

Further, as shown in FIG. 5B, even if the wear is further progressed at a second wear stage, the step 25a extending axially as formed in the comparison embodiment is not produced on the truncated cone portion 25 due to the second conical seat 28b. Even if the first conical seat 28a is pressed and expanded radially outward by the pressure of the fuel pressure chamber 30, there is no edge portions that cut into the valve seat member 28. Accordingly, the valve seat member 28 does not stick to the valve member 24 so that the check valve 23 can operate stably for a long period of time, realizing the fuel injection pump 10 having longer endurance and higher reliability.

Further, according to the first embodiment, the valve opening pressure of the check valve 23 can be kept constant for a longer period of time, even if the first conical seat 28a is worn out, since the circumferential edge 24a of the valve member 24, which comes in contact with the first conical seat 28a, is an axial end of the truncated cone portion 25 on a large diameter side.

In place that the circumferential edge 24a of the valve member 24 comes in contact with the first conical seat 28a, when the valve member is initially assembled to the valve seat member 28, another circumferential edge of the valve member 24 on a small diameter side may come in contact with the first conical seat 28a or a circumferential boundary between the first and second seats 28a and 28b may come in contact with the truncated cone portion 25 of the valve member 24.

(Second Embodiment)

A check valve 123 according to a second embodiment is described with reference to FIGS. 6A and 6B.

Figure 6A:
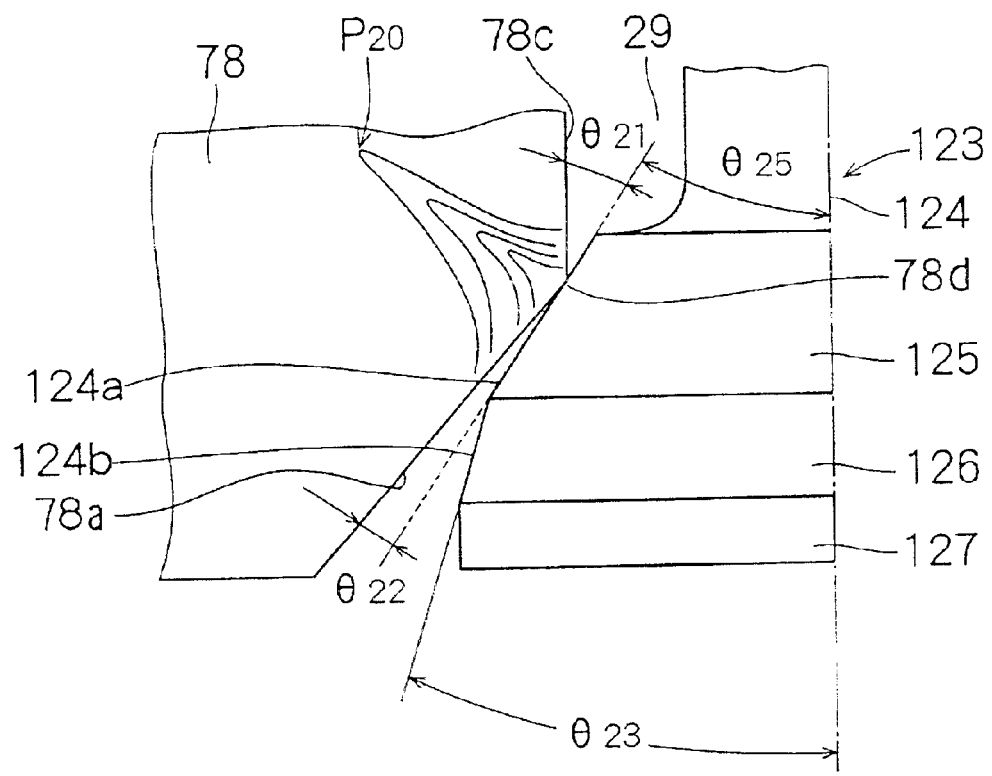
FIG. 6A is a partly enlarged schematic view of a valve seat member and a valve member of a check valve at an initial assembly stage according to a second embodiment of the present invention.

As shown in FIG. 6A, a valve member 124 has a first truncated cone portion 125, a second truncated cone portion 126 and a large diameter portion 127. A side surface of the first truncated cone portion 125 is a first conical face 124a that comes in contact with a conical seat 78a of the valve seat member 78 at the valve closing time. A side surface of the second truncated cone portion 126 is a second conical face 124b downstream and immediately adjacent the first conical face 124a.

The valve seat member 78 is provided inside with an inner wall that forms the fuel passage. The conical seat 78a and a cylindrical portion 78c are formed on the inner wall of the valve seat member 78. A boundary between the conical seat 78a and the cylindrical portion 78c constitutes a circumferential edge 78d of the conical seat 78a which comes in contact with the first truncated cone portion 125 at the valve closing time and at the initial assembly stage. At this time, a first relief angle $\theta_{21}$ of the first conical face 124a to the cylindrical portion 78c and a second relief angle $\theta_{22}$ of the second conical face 124b to the conical seat 78a are formed, as shown in FIG. 6A. Pressure of contact surface between the circumferential edge 78d and the first conical face 124a shows a pattern having a peak $P_{20}$, as shown in FIG. 6A. A seat angle $\theta_{25}$ of the first conical face 124a to the axis of the valve member 124 is larger than a seat angle $\theta_{23}$ of the second conical face 124b thereto ($\theta_{25} > \theta_{23}$). As the second relief angle $\theta_{22}$ is smaller, the contact surface between the valve member 124 and the valve seat member 78 is larger due to resilient deformation of the conical seat 78a. Accordingly, it is preferable that the second relief angle $\theta_{22}$ is as small as possible.

Figure 6B:
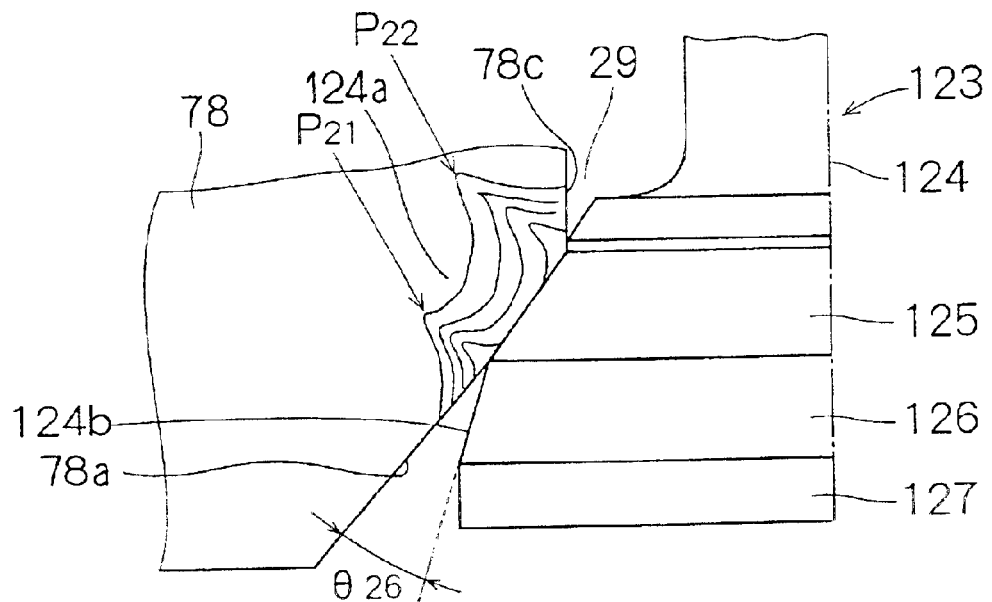
FIG. 6B is a partly enlarged schematic view of the valve seat member and the valve member of the check valve at a first wear stage according to the second embodiment.

As shown in FIG. 6B, at the valve closing time and at a first wear stage of the check valve 123, the valve seat member 78 and the valve member 124 are worn out to a certain extent that a larger area of the first conical face 124a comes in contact with the conical seat 78a and the second relief angle $\theta_{22}$ becomes almost zero or disappears. At this time, a third relief angle $\theta_{26}$ of the second conical face 124b to the conical seat 78a is formed and pressure of contact surface between the first conical face 124a and the conical seat 78a shows a pattern having first and second peaks $P_{21}$ and $P_{22}$, as shown in FIG. 6B.

According to the second embodiment, the third relief angle $\theta_{26}$ is smaller than the third relief angle $\theta_{36}$ of the comparison embodiment ($\theta_{26} < \theta_{36}$). Accordingly, the second peak $P_{22}$ of the second embodiment is smaller than the second peak $P_{32}$ of the comparison embodiment so that pressure applied to the contact surface of the valve seat member 78 is more uniformly dispersed. As a result, wear amount of the conical surface 78a of the second embodiment is smaller, compared with that of the comparison embodiment.

In place that the circumferential edge 78d of the conical seat 78a comes in contact with the first truncated cone portion 125 at the initial assembly stage, a boundary between the first and second truncated cone portions 125 and 126 may come in contact with the conical seat 78a.

(Third Embodiment)

A check valve 223 according to a third embodiment is described with reference to FIGS. 7A to 8B. The check valve 223 has the valve member 124 similar to the second embodiment and the valve seat member 28 similar to the first embodiment.

Figure 7A:
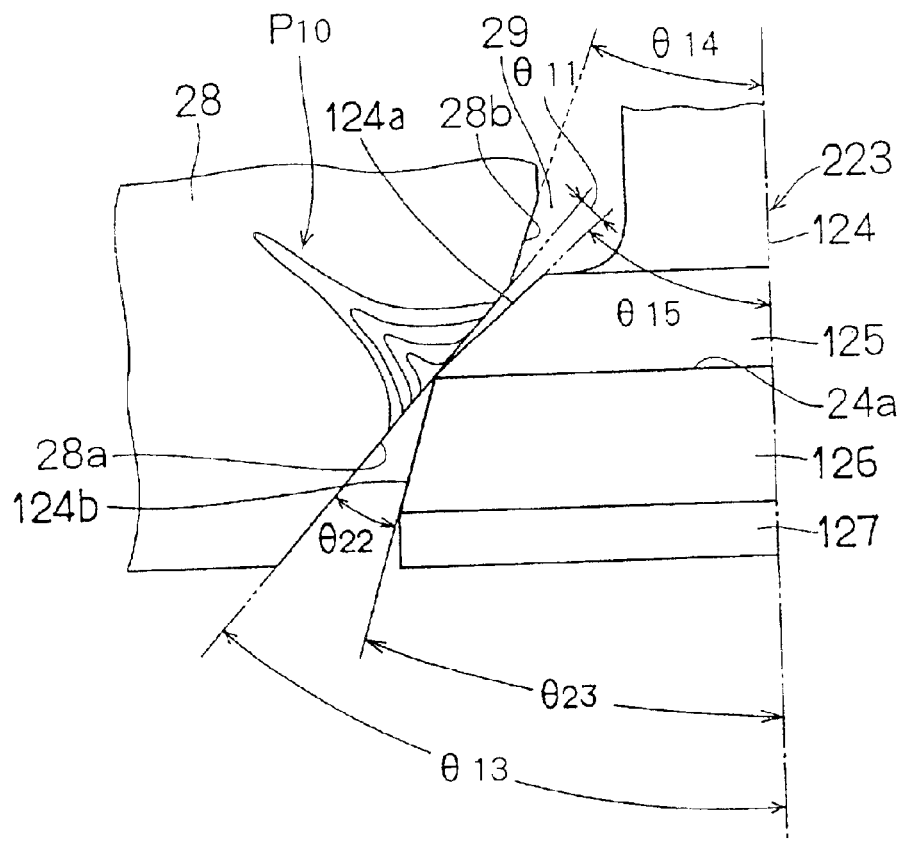
FIG. 7A is a partly enlarged schematic view of a valve seat member and a valve member of a check valve at an initial assembly stage according to a third embodiment of the present invention.
Figure 8A:
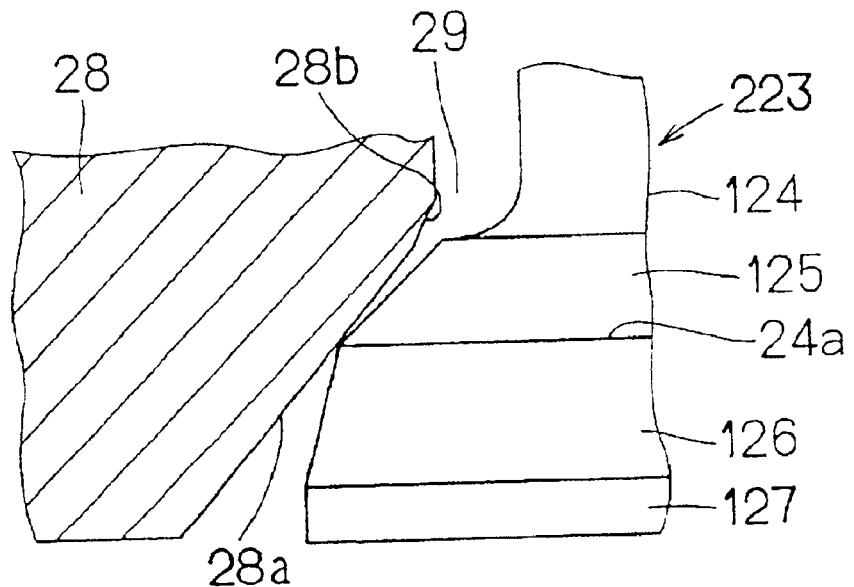
FIG. 8A is a cross sectional view of the valve member in contact with the valve seat member at the initial assembly stage according to the third embodiment.

As shown in FIGS. 7A and 8A, the valve member 224 has the first truncated cone portion 125, the second truncated cone portion 126 and the large diameter portion 127. The side surface of the first truncated cone portion 125 is the first conical face 124a that comes in contact with the first conical seat 28a of the valve seat member 28 at the valve closing time. The side surface of the second truncated cone portion 126 is the second conical face 124b downstream and immediately adjacent the first conical face 124a.

The valve seat member 28 is provided inside with an inner wall that forms the fuel passage. The first and second conical seats 28a and 28b are formed on the inner wall of the valve seat member 28. A boundary between the first conical face 124a and the second conical face 124b constitutes the circumferential edge 24a of the first truncated corn portion 125 which comes in contact with the first conical seat 28a, at the valve closing time and at the initial assembly stage. At this time, the first relief angle $\theta_{11}$ of the first conical face 124a to the first conical seat 28a and the second relief angle $\theta_{22}$ of the second conical face 124b to the first conical seat 28a are formed, as shown in FIG. 7A. Pressure of contact surface between the circumferential edge 24a and the first conical seat 28a shows the pattern having the peak $P_{10}$, as shown in FIG. 7A. The seat angle $\theta_{15}$ of the first conical face 124a to the axis of the valve member 124 is larger than the seat angle $\theta_{23}$ of the second conical face 124b thereto ($\theta_{25} > \theta_{23}$). The seat angle $\theta_{15}$ of the first conical face 124a to the axis of the valve member 124 is larger than the seat angle $\theta_{13}$ of the first conical seat 28a thereto ($\theta_{15} > \theta_{13}$). As the first relief angle $\theta_{11}$ is smaller, the contact surface between the valve member 124 and the valve seat member 28 is larger due to resilient deformation of the first conical seat 28a. Accordingly, it is preferable that the first relief angle $\theta_{11}$ is as small as possible.

Figure 7B:
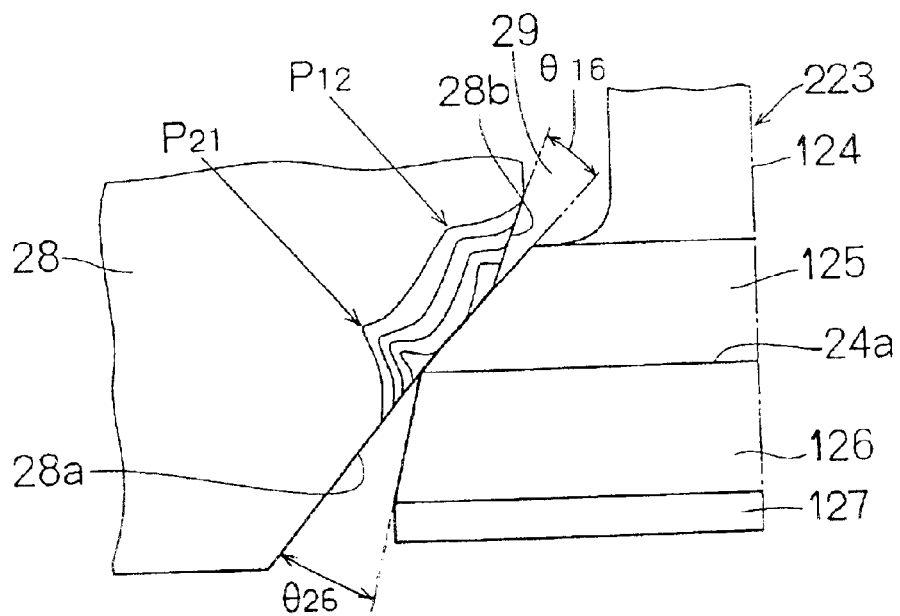
FIG. 7B is a partly enlarged schematic view of the valve seat member and the valve member of the check valve at a first wear stage according to the third embodiment.

As shown in FIG. 7B, at the valve closing time and at a first wear stage of the check valve 223, the valve seat member 28 and the valve member 124 are worn out to a certain extent that a larger area of the first conical face 124a comes in contact with the first conical seat 28a and the first relief angle $\theta_{11}$ becomes almost zero. At this time, the third relief angle $\theta_{26}$ of the second conical face 124b to the first conical seat 28a and another third relief angle $\theta_{16}$ of the first conical face 124a to the second conical seat 28b are formed and pressure of contact surface between the first conical face 124a and the first conical seat 28a shows a pattern having first and second peaks $P_{21}$ and $P_{12}$, as shown in FIG. 7B.

According to the third embodiment, each of the third relief angle $\theta_{16}$ and $\theta_{26}$ is smaller than the third relief angle $\theta_{36}$ of the comparison embodiment. Accordingly, the first or second peak $P_{11}$ or $P_{22}$ of the third embodiment is smaller than the first or second peak $P_{31}$ or $P_{32}$ of the comparison embodiment so that pressure applied to the contact surface of the valve seat member 28 is more uniformly dispersed.

Figure 8B:
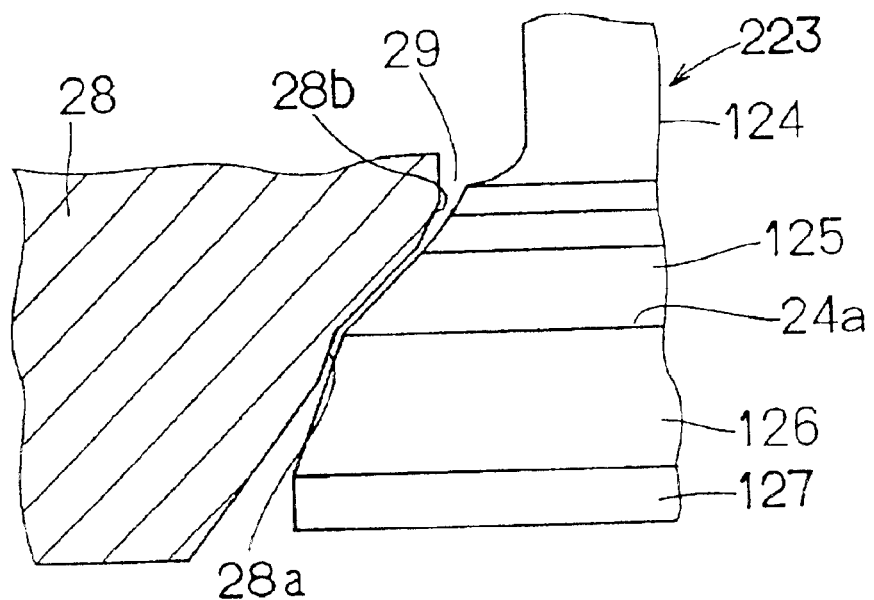
FIG. 8B is a cross sectional view of the valve member in contact with the valve seat member at a second wear stage according to the third embodiment.

Further, as shown in FIG. 8B, even if the wear is further progressed at the second wear stage, the step 25a extending axially as formed in the comparison embodiment is not produced on the first truncated cone portion 125 due to the second conical seat 28b. Even if the first conical seat 28a is pressed and expanded radially outward by the pressure of the fuel pressure chamber 30, there is no edge portions that cut into the valve seat member 28. Accordingly, the valve seat member 28 does not stick to the valve member 124 so that the check valve 223 can operate stably for a longer period of time, realizing the fuel injection pump 10 having longer endurance and higher reliability.

In the first to third embodiments, instead of providing the valve seat member 28 of the check valve 23, 123 or 223 separately from the pump housing 10a, the valve seat member 28 may be formed integrally in the pump housing 10a.

What is claimed is:

1. A check valve for permitting fluid to flow in one direction in a fluid passage comprising:

a valve seat member having an inner wall that forms the fluid passage, the inner wall being provided with immediately adjacent first and second conical seats and the second conical seat being positioned upstream the first conical seat; and a valve member being provided at an outer circumference thereof with a conical face that comes in contact with the first conical seat for closing the fluid passage and away therefrom for opening the fluid passage, wherein an angle of the second conical seat to an axis of the valve member is more acute than that of the first conical seat, and a seat angle of the conical face of the valve member to the axis is larger than the angles of the first and second conical seats to the axis of the valve member, wherein a circumferential boundary between the first and second conical seats is formed at such a place where a distance of the circumferential boundary to the axis of the valve member is between the minimum and maximum distances of the conical face to the axis of the valve member so that the boundary may come in contact with the conical face of the valve member after the first conical seat and the conical face become worn.

2. A check valve according to claim 1, wherein the conical face is a side surface of a truncated cone and, when the valve member is initially assembled to the valve seat member, a circumferential edge of the valve member comes in contact with the first conical seat.

3. A check valve according to claim 1, wherein the conical face is a side surface of a truncated cone and, when the valve seat member and the valve member are worn by a predetermined amount, the circumferential boundary between the first and second conical seats comes in contact with the conical face.

4. A check valve according to claim 1, further comprising:

a relief conical face provided in the valve member, the relief conical face being positioned immediately adjacent to and downstream the conical face and an angle of the relief conical face to an axis of the valve member being more acute than that of the conical face.

5. A check valve according to claim 4, wherein each of the conical face and the relief conical face is a side surface of truncated cone and, when the valve member is initially assembled to the valve seat member, a circumferential edge of the conical face on a side of the relief conical face comes in contact with the first conical seat.

6. A check valve according to claim 4, wherein each of the conical face and the relief conical face is a side surface of truncated cone and, when the valve seat member and the valve member are worn by a predetermined amount, a circumferential edge of the first conical seat on a side of the second conical seat comes in contact with the conical face.

7. A check valve for permitting fluid to flow in one direction in a fluid passage comprising:
- a valve seat member having an inner wall that forms the fluid passage, the inner wall being provided with a conical seat; and
- a valve member being provided at an outer circumference thereof with immediately adjacent first and second conical faces, the second conical face being positioned downstream the first conical face and the first conical face coming in contact with the conical seat for closing the fluid passage and away therefrom for opening the fluid passage,
- wherein an angle of the second conical face to an axis of the valve member is more acute than that of the first conical face, and
- wherein the first conical face is a side surface of truncated cone so that the side surface has a straight line in its cross section.

8. A check valve according to claim 7, wherein each of the first and second conical faces is a side surface of truncated cone and, when the valve member is initially assembled to the valve seat member, one of axial end circumferential peripheries of the conical seat comes in contact with the first conical face.

9. A check valve according to claim 7, wherein each of the first and second conical faces is a side surface of truncated cone and, when the valve seat member and the valve member are worn by a predetermined amount, a circumferential edge of the first conical face on a side of the second conical face comes in contact with the conical seat.

10. A fuel injection pump for a diesel engine and to be driven by a drive shaft comprising:
- a pump housing having fuel inlet passages, fuel pressure chambers and fuel outlet passages;
- a cam housed in the housing and rotatable together with the drive shaft;
- a plurality of plungers housed in the housing and arranged around the cam at given angular intervals, each of the plungers being reciprocatingly movable according to the rotation of the cam so that fuel sucked from each of the fuel inlet passages to each of the fuel pressure chambers is pressurized and discharged to each of the fuel outlet passages; and
- a check valve recited in any one of claims 1 to 9, which is provided in each of the fuel inlet passages, wherein the pressurized fuel pressure in the fuel pressure chamber is applied to a valve member of the check valve in its closing direction.

* * * * *